A. W. HARRIS.
CLUTCH MECHANISM.
APPLICATION FILED DEC. 13, 1918.
1,398,552.
Patented Nov. 29, 1921.
3 SHEETS—SHEET 1.
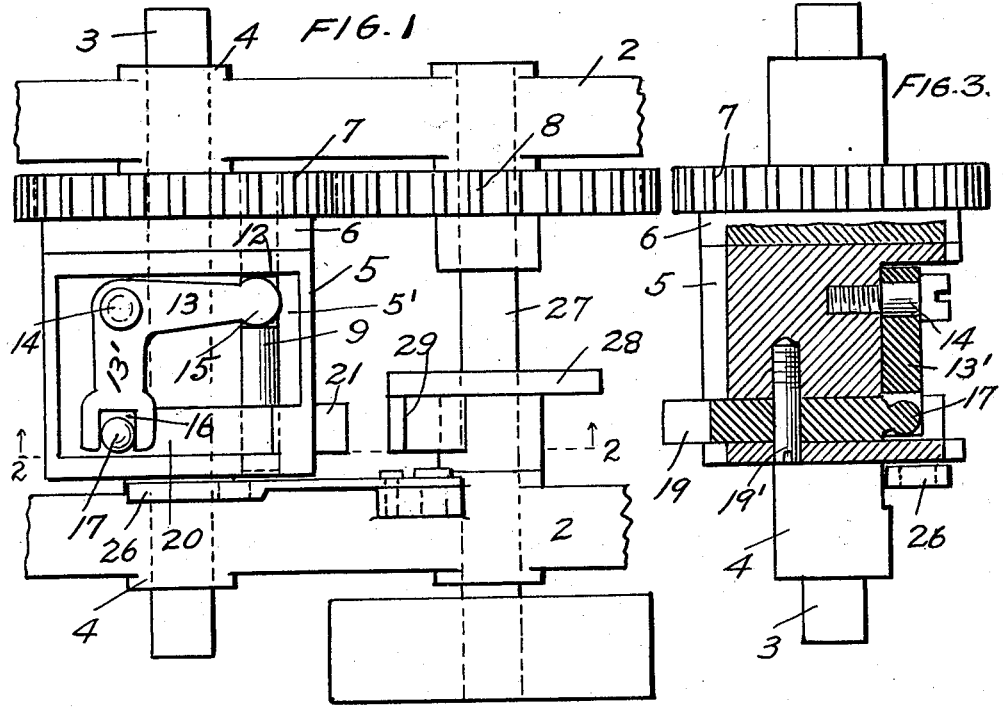
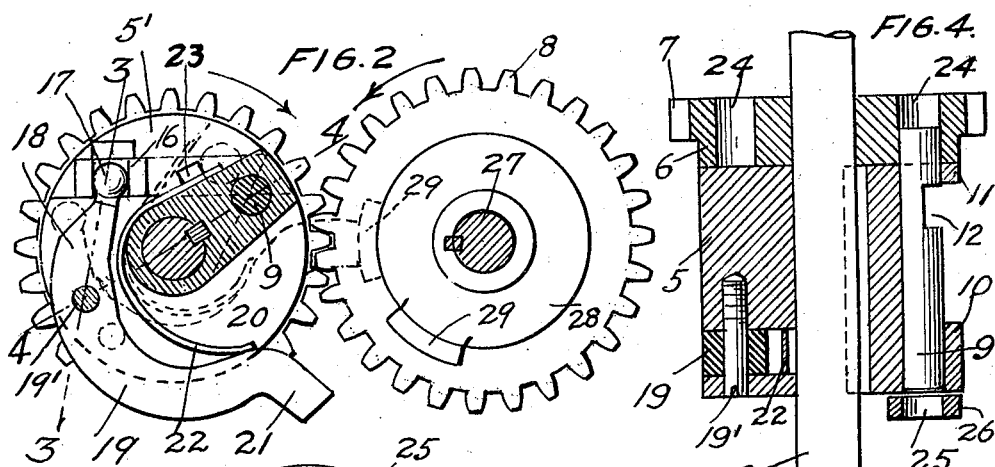
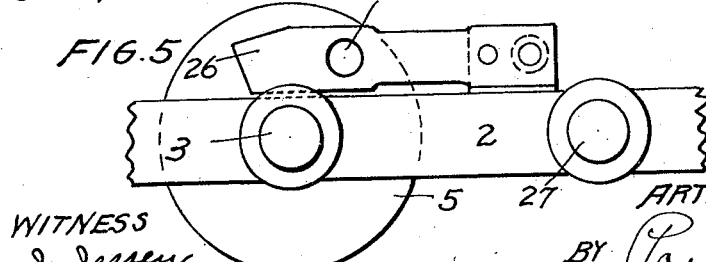
WITNESS
J. Jessen
INVENTOR
ARTHUR W. HARRIS
BY Paul H. Buel
HIS ATTORNEYS

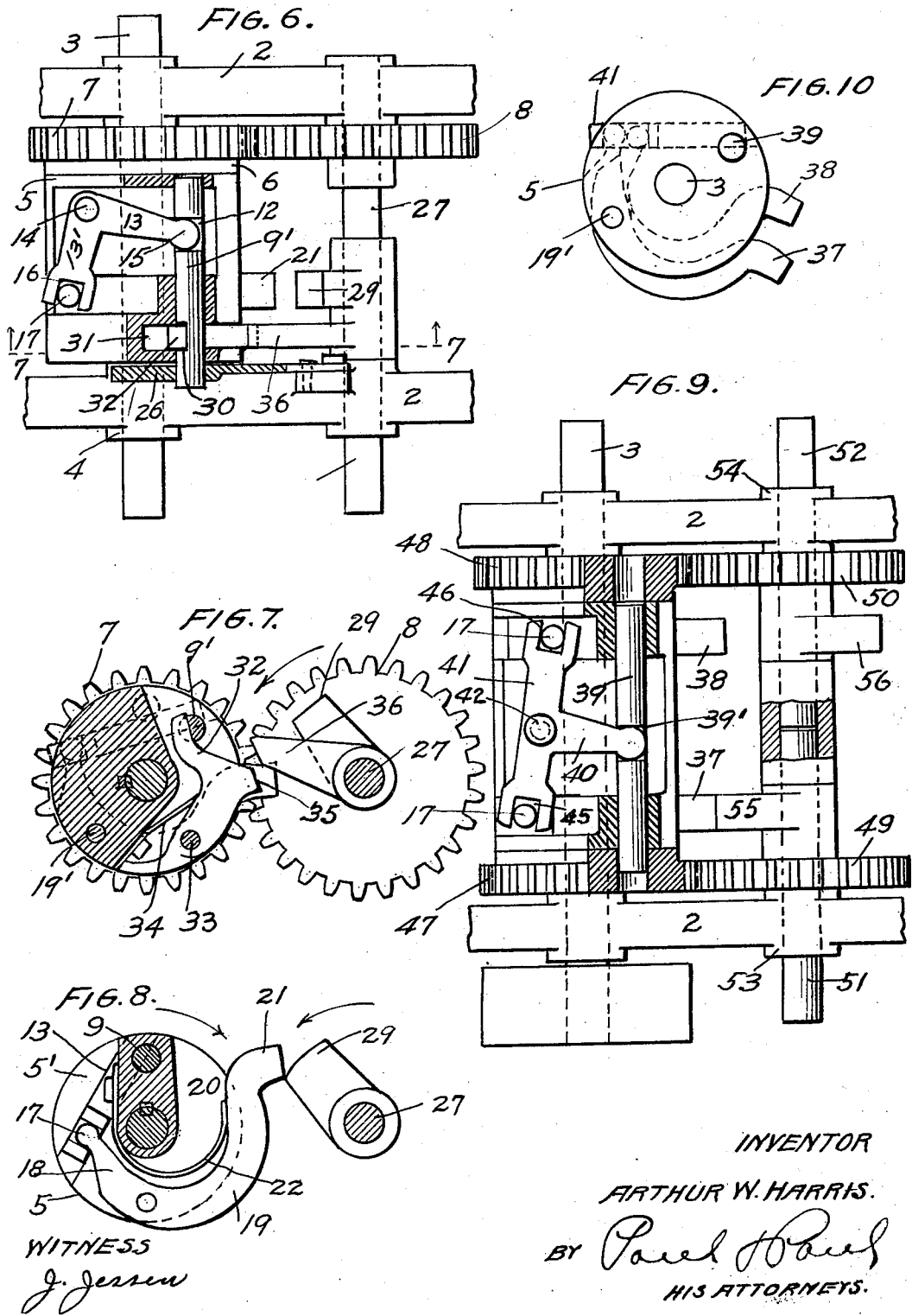

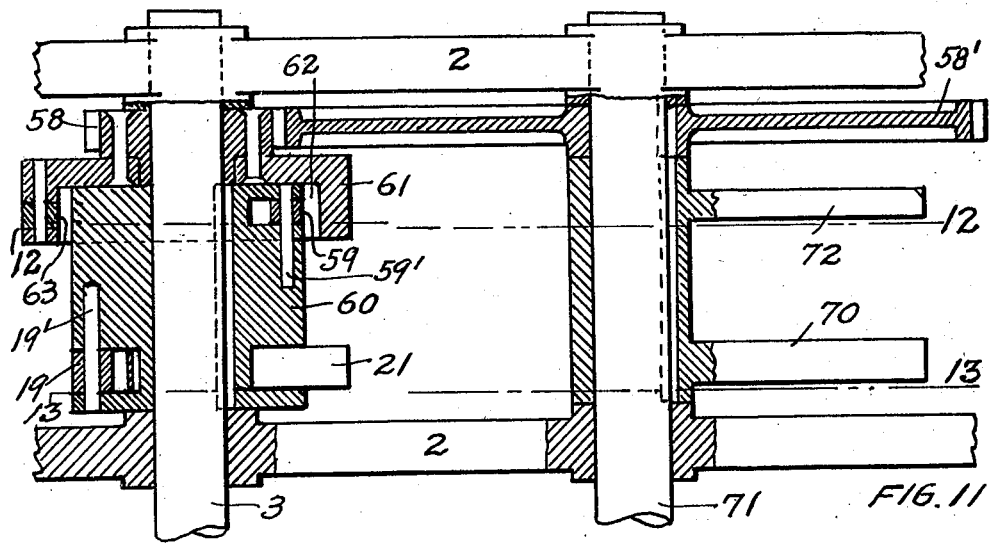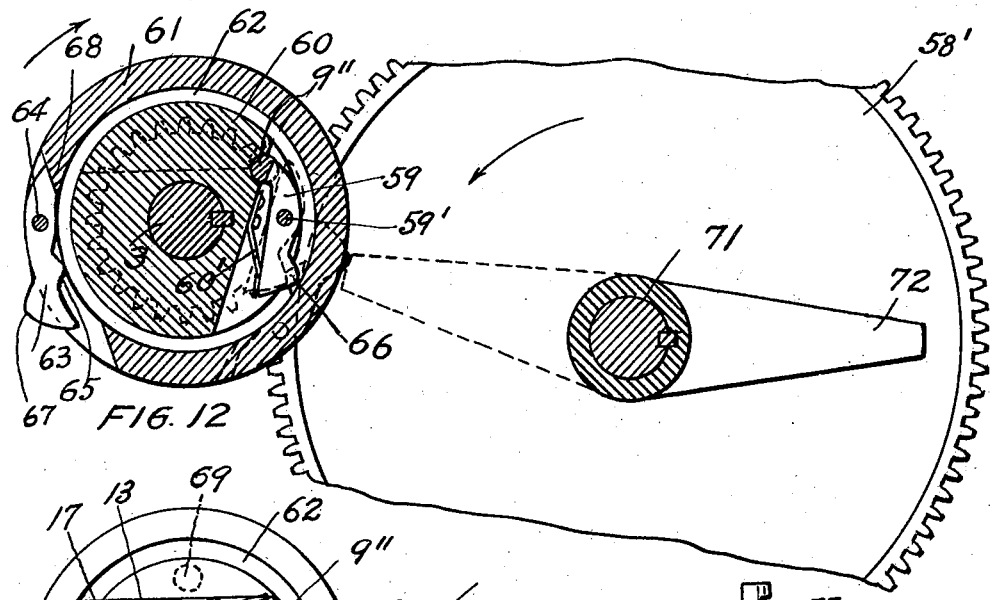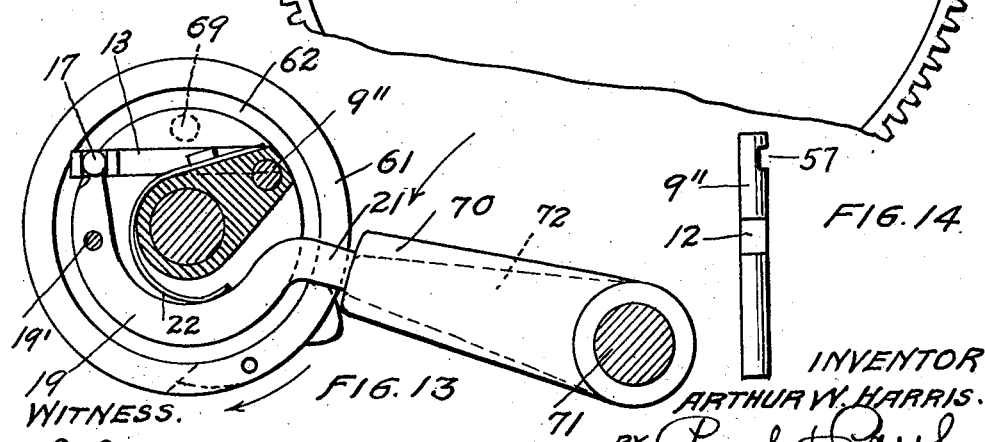

UNITED STATES PATENT OFFICE.

ARTHUR W. HARRIS, OF SLEEPY EYE, MINNESOTA.

CLUTCH MECHANISM.

1,398,552.  Specification of Letters Patent.  Patented Nov. 29, 1921.

Application filed December 13, 1918. Serial No. 266,604.

*To all whom it may concern:*

Be it known that I, ARTHUR W. HARRIS, a citizen of the United States, resident of Sleepy Eye, county of Brown, State of Minnesota, have invented certain new and useful Improvements in Clutch Mechanism, of which the following is a specification.

My invention relates in general to clutches for automatically starting and stopping a rotatable shaft or other mechanism and more particularly to a clutch for causing and controlling the intermittent motions of various durations necessary in many classes of automatic machinery.

The object of the invention is to produce a clutch that is simple in construction and efficient in operation and that can be readily applied to cause a great variety of motion and pause durations and that will automatically lock the parts and mechanism connected to it against any movement when they are at rest.

I attain these objects by the mechanism illustrated in the accompanying drawings in which, Figure 1 is a plan view of a clutch mechanism embodying my invention, Fig. 2 is a section on the line 2—2 of Fig. 1, Fig. 3 is a section on the line 3—3 of Fig. 2, Fig. 4 is a section on the line 4—4 of Fig. 2, Fig. 5 is a side elevation of a part of Fig. 1, Fig. 6 illustrates a clutch provided with a modified form of control mechanism, Fig. 7 is a section on line 7—7 of Fig. 6, Fig. 8 illustrates the operation of some of the clutch parts, Fig. 9 is a modification of the clutch connections, Fig. 10 is a detail of Fig. 9, Fig. 11 is a sectional view of a modified clutch construction, Fig. 12 is a section on the line 12—12 of Fig. 11, Fig. 13 is a section on the line 13—13 of Fig. 11, Fig. 14 is a detail view.

In the drawing, 2 represents the frame of any machine to which the clutch may be applied. 3 is an intermittently driven shaft, mounted in suitable bearings 4 of the machine. 5 is the driven and intermittent member of the clutch, securely mounted on the shaft 3. Adjoining the member 5 is the constantly rotating or driving member 6 of the clutch, which is provided with gear teeth 7 meshing with a gear 8 from which it derives motion. The intermittent clutch member 5 consists of an annular clutch body provided near its circumference with a clutch pin 9 sliding parallel with the shaft 3 in bearings 10 and 11. The clutch 5 is recessed across its body between the bearings 10 and 11 to a depth on a line with the center of the clutch pin 9 and shouldered notch 12 is cut in the pin to a depth flush with the bottom of the recess 5'. A bell crank lever 13 is pivoted at 14 on the flat bottom of the recess and a rounded head 15 on a crank arm of the lever 13 engages the shoulders of the notch 12. The outer end of the other crank arm 13' is provided with a slot 16 engaging the rounded end 17 of the short arm 18 of a curved lever 19. This lever is arranged in a slotted recess 20 in the clutch body and the pivot pin 19' upon which it swings is arranged opposite the clutch pin 9 parallel to the shaft 3 and at right angles to the pivot of the bell crank lever 13. The long arm of the clutch lever conforms to the curve of the clutch body except at its extreme end, where it curves outwardly and forms the projection 21. A flat tension spring 22 is fastened at 23 to the clutch body and is curved around in the recess 20 bearing against the long arm of the lever 19 tending to force the projections outward. If nothing prevents outward movement of the long end of the curved lever, the short arm 18 is forced inward, the bell crank lever 13 is swung upon its pivot, moving the clutch pin 9 parallel with the shaft 3 outward beyond the end of clutch member 5 and toward the rotating clutch member 6. One or more clutch holes or recesses 24 are provided in the clutch member 6 to receive the clutch pin or bolt 9. When the clutch pin is forced in the opposite direction by means hereinafter described, it projects beyond the clutch body on the opposite end and enters a locking recess or hole 25 arranged in a stationary lock bar 26. This bar is secured to the frame 2 and is formed to allow a slight lateral movement for the purpose of yielding when the clutch pin is forced against it before entering the recess.

To operate the clutch and alternately connect and disconnect the clutch pin 9 from the rotating member 6 after certain intervals, I prefer to use mechanism rotating in unison with the member 6. The gear 8 meshing with the gear 7 of the clutch member 6 is fastened to a shaft 27 having bearings in the frame 2. A clutch operating member or disk 28 is also secured to the shaft 27 and partakes of the rotation of the gear 8. A cam 29 projects from the disk 28 and rotates directly opposite the clutch lever 19 upon its pivot and withdraws the clutch pin from the clutch member 6. At the moment the clutch pin is released from the rotating clutch member 6 it enters the stationary recess 25 in the lock bar 26, thus locking the clutch member 5 and shaft 3 securely against movement.

The methods of controlling the intermittent periods of the clutch operations have been described in a separate application for intermittent gear and forms no part of this invention.

The clutch member 5 may be started when the cam 29 ceases contacting with the lever 19, as the clutch pin then bears against the face of the member 6, impelled by the spring 22, and free to enter any clutch recess in the rotating member 6, first coming in alinement with the pin 9, when it quickly enters the recess and is released from the lock bar 26. This causes the member 5 and shaft 3 to rotate until the clutch lever 19 is again engaged by the cam 29 to stop its motion. The length of the clutch pin is such that when it is in full engagement with the locking bar 26 it will be clear of the rotating clutch member 6. When the clutch pin 9 is held out of engagement with the rotating member 6 by bearing against its face or by an extended face of the cam 26, a certain amount of friction is developed. To prevent this, I provide independent means for locking the moving parts separated from the clutch.

In Figs. 6 and 7 such means are illustrated. The clutch body and pin 9 are slightly lengthened and a second notch 30 is provided in the pin 9 which enters a slotted recess 31 in which is a pivoted locking latch 32 adapted to drop into the notch 30 when the clutch pin 9 is in the locked position. The locking latch 32 is pivoted at 33 and a spring 34 tends to force the latch into the notch 30. A projecting end 35 extends beyond the peripheral line of the clutch member 6 in the path of a cam arm 36 that is secured to the shaft 27. At a predetermined moment in the rotation of the shaft 27, the cam arm 36 engages the projecting end of the latch 32 and releases it from the notch 30, permitting the pin 9 to enter the rotating clutch member 5 and start the clutch.

In Figs. 9 and 10 I have illustrated a modified form of clutch useful where it is necessary to start one set of mechanism immediately when another set is stopped, either in the same or opposite directions. Two clutch levers 37 and 38, identical in all respects with the clutch lever 19, are arranged in a recessed slot at each end of the clutch body 5'. The clutch pin 39 has a central notch 39' in which rests the rounded head of an arm 40 of a T-shaped lever 41 pivoted centrally to the clutch at 42 and having oppositely extending crank arms provided with slots 45 and 46 engaging the clutch levers 37 and 38.

With this construction the clutch body 5' is the driving and running element and the geared members 47 and 48 are the driven, intermittently-rotating members of the clutch. The gears of the members 47 and 48 are in mesh with gears 49 and 50 arranged upon shafts 51 and 52 to which the rotation of the members 47 and 48 is transmitted. The shafts 51 and 52 are mounted in bearings 53 and 54 and carry the cam arms 55 and 56 which are adapted when rotating to contact with the projecting ends of the levers 37 and 38 and throw the clutch pin 39 in and out of driving connection with the gear members 47 and 48. It will be seen that when one of the clutch members 47 or 48 is disengaged from the clutch pin 39 the other is immediately engaged and that therefore when one of the shafts 51 or 52 is in operation, the other is stationary. The duration of the periods of motion and rest is determined by the gear ratios and length of contact between the cam arms 55 and 56 and clutch levers 37 and 38 and may be different for each shaft.

In Figs. 11, 12, 13 and 14 I have illustrated a clutch modified in some particulars hereinafter described to obtain prolonged periods of stops for the clutch body and shaft. By a reference to Figs. 6 and 7 it will be seen that the latch 32, when locking the clutch pin 9' from connection with the running member of the clutch, stops with the clutch body in position to be contacted by the cam arm 36. This stoppage limits the number of revolutions that the contacting cam arm may make before it again engages the latch to start the clutch. By providing an auxiliary releasing dog, connected to the running clutch member and controlled by a rotating cam arm, as long periods of rest as of movement may be procured by suitable speed ratios between the clutch and controller arms. An enlarged annular clutch member 61 is secured to the gear 58 in any suitable manner. It is recessed to receive one end of the clutch body 60, the recess 62 being considerably larger in diameter than the clutch body. A locking latch 59 for the clutch pin 9" is pivoted to the clutch body at 59' within the recess 62. One end of the latch engages a notch 57 in the pin 9″ when the pin is withdrawn from the clutch member 61 and the other end is provided with a beveled catch 66 projecting outward beyond the edge of the clutch body when the latch engages the notch 9″. A spring 60′ tends to hold the latch in this position. The auxiliary or latch-releasing dog 63 is pivoted at 64 in a slot in the flange of the clutch member 61. It is provided with a beveled lug 65 projecting inward and adapted, when depressed, to contact with the catch 66 of the latch 59 at a certain point of each revolution of the clutch member 61 when the clutch body 60 is at rest. One end of the releasing dog 63 is provided with a cam portion 67 caused by centrifugal force to normally project beyond the outer circumference of the clutch member 61, while the opposite end 68 bears against a stop.

The mechanism for withdrawing the clutch pin 9″ from the running clutch member and locking the clutch body against rotation is identical with the mechanism heretofore described and is controlled by a cam arm 70 fastened to a constantly running shaft 71 which carries a large gear 58′ meshing with the small gear 58. A second cam arm 72 rotates with the shaft 71 and is adapted to periodically contact with and depress the releasing dog 63 just when the catch 66 and lug 65 pass each other, as indicated in the dotted lines in Fig. 12. When this occurs, the latch 59 is disengaged from the clutch pin 9″, releasing the pin for entrance into the aperture or recess 69 in the running clutch member 61 and starting the clutch body and shaft 3. The time elapsing or number of revolutions the gear 58 may make after the clutch is stopped until it is again started is accurately gaged by the gear ratio of the gears 58 and 58′. As the method of determining and obtaining the time elements for starting and stopping the clutch form no part of the present invention it is not deemed necessary to explain this feature in detail.

Various modifications may be made in the details of construction coming within the scope of this invention and I do not, therefore, limit myself strictly to the construction shown.

I claim as my invention:

1. A clutch comprising a shaft, a pair of clutch members mounted thereon, a reciprocating bolt member mounted in one of said clutch members to engage and interlock with the other member, a crank arm mounted in one of said clutch members for operating said bolt member, and a clutch lever mounted in one of said clutch members and operatively connected with said crank arm and rotating said clutch member to control the clutch.

2. A clutch comprising a shaft and a rotating and an intermittent clutch member mounted thereon, a reciprocating bolt member mounted in said intermittent clutch member for intermittently interlocking with the other member, a rocking crank arm having its axis at an angle to said shaft and connected with said bolt member, means for oscillating said crank arm to reciprocate said bolt member and a locking device for said intermittent clutch member engaging said bolt member and yielding axially with the shaft.

3. In a clutch, the combination, with a rotatable shaft and clutch members mounted upon said shaft, of an interlocking member sliding parallel to said shaft in one of said clutch members, a crank arm connected to said interlocking member and pivoted to said clutch member axially at an angle to said shaft, a clutch lever connected to said crank arm and having a pivot in said clutch member, said pivot being axially parallel with the axis of the shaft and said clutch lever rotating with said clutch member.

4. The combination, with a rotatable shaft and a pair of clutch members mounted upon said shaft, of an interlocking member sliding parallel to said shaft in one of said clutch members, a crank arm connected to said interlocking member and pivoted to said clutch member axially at an angle to said shaft, a clutch lever connected to said crank arm and pivoted to said clutch member, axially parallel with the axis of the shaft, said lever rotating with said clutch member for operating said lever to control the clutch.

5. The combination, with a shaft and a pair of rotatable clutch members mounted upon said shaft, an interlocking member sliding parallel to said shaft in one of said clutch members, a crank arm connected to said interlocking member and pivoted to said clutch member axially at an angle to said shaft, a clutch lever connected to said crank arm and having pivoted connections with said clutch member, said connections being mounted upon said clutch member and axially parallel with the axis of said shaft, and an arm upon said clutch lever rotating therewith and a cam engaged by said arm for operating said lever to control the clutch.

6. The combination, with a shaft and a pair of rotatable clutch members mounted upon said shaft, of an interlocking member sliding parallel to said shaft in one of said clutch members, a crank arm connected to said interlocking member and pivoted to said clutch member axially at an angle to said shaft, a clutch lever mounted upon said clutch members and having pivoted connections therewith, said connections being axially parallel with the axis of the shaft, an arm on said clutch lever normally extending outward from said shaft and means for depressing said arm to operate said lever periodically to stop the clutch, and means for positively locking said clutch member against rotary movement.

7. The combination, with a shaft, a pair of rotatable clutch members mounted upon said shaft, an interlocking member sliding parallel to said shaft in one of said clutch members, a crank arm connected to said interlocking member and pivoted to said clutch member axially at an angle to said shaft, a clutch lever having pivoted connections with said clutch member and rotating therewith, the axis of said connections being parallel with the axis of the shaft, an arm on said clutch lever for operating said lever periodically to disengage the interlocking member from one of said clutch members, a catch for keeping said interlocking member out of engagement with said clutch member, said clutch being pivoted to said clutch member and rotating therewith and having a lug thereon and a cam engaged by said lug to release said catch for again interlocking the clutch members.

8. A clutch mechanism comprising a shaft, a constantly rotating clutch member and an intermittent clutch member mounted upon said shaft, a reciprocating locking member mounted in the intermittent clutch member to engage and interlock with the rotating clutch member, a crank arm pivoted upon said intermittent clutch member for operating said locking member, a rotating clutch lever operatively connected to the crank arm, said lever being mounted upon said intermittent clutch member and rotating therewith and a rotating cam arm geared to said rotating clutch member to periodically contact said clutch lever to disengage the clutch locking member.

9. A clutch mechanism comprising a shaft, a constantly rotating and an intermittently rotating clutch member mounted upon said shaft, a reciprocating locking member mounted in said intermittent clutch member to engage and interlock with said rotating clutch member, a crank arm mounted in said intermittent clutch member for operating said locking member, a clutch lever operatively connected to said crank arm and pivoted to said intermittent clutch member and rotating therewith for disengaging said lock member from said rotating clutch member, an intermittently rotating lock lever for locking said locking member out of engagement with said rotating clutch member, and a rotating cam arm geared to said rotating clutch member to periodically contact said catch lever and said clutch lever to engage and disengage the clutch locking member.

10. A clutch mechanism comprising a shaft, a constantly rotating clutch member and an intermittent clutch member mounted upon said shaft, a reciprocating locking member mounted in said intermittent clutch member to engage and interlock with said rotating clutch member, a clutch lever pivoted to said intermittent clutch member and rotating therewith, operative connections between said clutch lever and said locking member for disconnecting said locking member from the rotating clutch member, a lock lever mounted on said intermittent clutch member for locking said locking member out of engagement with said rotating clutch member, a rotating cam arm mounted on said rotating clutch member for unlocking said lock lever from said locking member, and a rotating cam arm geared to said rotating clutch member to periodically contact said cam arm to disengage said lock lever from said clutch locking member.

In witness whereof I have hereunto set my hand this 27th day of November, 1918.

ARTHUR W. HARRIS.